(12) United States Patent
Yang et al.

(10) Patent No.: US 12,438,625 B2
(45) Date of Patent: Oct. 7, 2025

(54) COMMUNICATION FOR VEHICULAR DEVICE

(71) Applicant: LG Electronics Inc., Seoul (KR)

(72) Inventors: Yoonoh Yang, Seoul (KR); Ilnam Cho, Seoul (KR); Sangwook Lee, Seoul (KR); Byeongyong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 18/014,640

(22) PCT Filed: Jul. 7, 2021

(86) PCT No.: PCT/KR2021/008652
§ 371 (c)(1),
(2) Date: Jan. 5, 2023

(87) PCT Pub. No.: WO2022/019534
PCT Pub. Date: Jan. 27, 2022

(65) Prior Publication Data
US 2023/0261768 A1    Aug. 17, 2023

(30) Foreign Application Priority Data

Jul. 20, 2020  (KR) .......................... 10-2020-0089895

(51) Int. Cl.
*H04B 17/29* (2015.01)
(52) U.S. Cl.
CPC .................... *H04B 17/29* (2015.01)
(58) Field of Classification Search
CPC ...................................................... H04B 17/29
See application file for complete search history.

(56) References Cited

U.S. PATENT DOCUMENTS

| | | | | |
|---|---|---|---|---|
| 10,129,891 | B2* | 11/2018 | Lim | H04B 17/102 |
| 2005/0176375 | A1* | 8/2005 | Bednasz | H04B 17/29 |
| | | | | 455/67.11 |

(Continued)

OTHER PUBLICATIONS

3GPP, "3rd Generation Partnership Project; Technical Specification Group Radio Access Network; NR; User Equipment (UE) radio transmission and reception; Part 1: Range 1 Standalone (Release 16)," 3GPP TS 38.101-1 V16.4.0, Jun. 2020, 406 pages.

(Continued)

*Primary Examiner* — Hsinchun Liao
(74) *Attorney, Agent, or Firm* — Fish & Richardson P.C.

(57) ABSTRACT

There is provided a UE in a wireless communication system, the UE comprising: at least one transceiver; at least one processor; and at least one computer memory operably connectable to the at least one processor and storing instructions that, based on being executed by the at least one processor, perform operations comprising: receiving downlink signal from a base station, wherein power class of the UE is power class X, which is for a vehicular UE configured to use an operating band including frequency range over 60 GHz, wherein the frequency range around 60 GHz is included in a frequency range of 52.6 GHz to 71 GHz, wherein the at least one transceiver is configured to satisfy a RF requirement for the power class X, wherein the RF requirement for the power class X includes at least one of EIS spherical coverage, or a reference sensitivity.

16 Claims, 14 Drawing Sheets

(56) References Cited

U.S. PATENT DOCUMENTS

2015/0271852 A1* 9/2015 Rahman .................. H04L 5/001
                                                                    370/329
2018/0049207 A1* 2/2018 Lim .................. H04W 72/0453
2020/0099562 A1* 3/2020 Pajukoski ........... H04L 27/2605

OTHER PUBLICATIONS

3GPP, "3rd Generation Partnership Project; Technical Specification Group Radio Access Network; NR; User Equipment (UE) radio transmission and reception; Part 2: Range 2 Standalone (Release 16)," 3GPP TS 38.101-2 V16.4.0, Jun. 2020, 172 pages.

3GPP, "5G; NR; User Equipment (UE) radio transmission and reception; Part 2: Range 2 Standalone (3GPP TS 38.101-2 version 15.4.0 Release 15)," ETSI TS 138 101-2 V15.4.0, Apr. 2019, 133 pages.

CTIA, "Test Plan for Wireless Device Over-the-Air Performance: Method of Measurement for Radiated RF Power and Receiver Performance," CTIA Certification Program Test Plan, Version 3.8.2, Apr. 2019, 628 pages.

Intel Corporation, "On UE power class for mmWave," R4-1706508, Presented at 3GPP TSG-RAN WG4 NR Adhoc Meeting #2, Qingdao, China, Jun. 27-29, 2017, 6 pages.

IWPC, "5G Millimeter Wave Frequencies And Mobile Networks: A Technology Whitepaper on Key Features and Challenges," IWPC White Paper, Jun. 14, 2019, 203 pages.

* cited by examiner

FIG. 7

| | Unit | V2V | | | | | |
|---|---|---|---|---|---|---|---|
| Distance | m | 100 | 200 | 300 | 500 | 700 | 1000 |
| Bandwidth | MHz | 50 | | | | | |
| Noise Floor | dBm | -87 | | | | | |
| Target SNR | dB | 6 | | | | | |
| Wanted Rx Signal Level @ RF | dBm | -81 | | | | | |
| Rx Antenna gain (Grx = Realized antenna array gain + polarization gain(2.5)) | dBi | 15 | 18 | 21 | | | |
| IL | dB | 7 | | | | | |
| Wanted Rx Signal Level @ Air | dBm | -89 | -92 | -95 | | | |
| PL | dB | 108 | 114 | 118 | 122 | 125 | 128 |
| Oxygen Attenuation | dBm | 1 | 2 | 3 | 5 | 7 | 10 |
| Required EIRP | dBm | 20 17 14 | 27 24 21 | 32 29 26 | 38 35 32 | 43 40 37 | 49 46 43 |
| Note: Numbers highlighted in a same way are used for a same pair. | | | | | | | |

FIG. 9

|  | Unit | V2V | | | | | |
|---|---|---|---|---|---|---|---|
| Distance | m | 100 | 200 | 300 | 500 | 700 | 1000 |
| Tx Antenna gain (Grx = Realized antenna array gain + polarization gain(2.5)) | dBi | | | 15 | | | |
| Implementation Loss(IL) | dB | | | 8 | | | |
| Tx Power | dB | 13 | 20 | 25 | 31 | 36 | 42 |
| Required EIRP(Gtx=15dBi) | dBm | 20 | 27 | 32 | 38 | 43 | 49 |
| Tx Antenna gain (Grx = Realized antenna array gain + polarization gain(2.5)) | dBi | | | 18 | | | |
| Implementation Loss(IL) | dB | | | 8 | | | |
| Tx Power | dB | 7 | 13 | 19 | 25 | 30 | 36 |
| Required EIRP(Gtx=18dBi) | dBm | 17 | 23 | 29 | 35 | 40 | 46 |
| Tx Antenna gain (Grx = Realized antenna array gain + polarization gain(2.5)) | dBi | | | 21 | | | |
| Implementation Loss(IL) | dB | | | 8 | | | |
| Tx Power | dB | 1 | 8 | 13 | 19 | 24 | 30 |
| Required EIRP(Gtx=21dBi) | dBm | 14 | 21 | 26 | 32 | 37 | 43 |

FIG. 10

| | Unit | Related requirements | | | | | |
|---|---|---|---|---|---|---|---|
| Distance | m | 300 | 200 | 300 | 400 | 300 | 800 |
| EIRP | dBm | 32 | 28 | 29 | 34 | 26 | 40 |
| Tx Power | dBm | 25 | 21 | 19 | 24 | 13 | 27 |
| Pout per element | dBm | 16 | 12 | 7 | 12 | -2 | 12 |
| # of antennas in array | | 8 | | 16 | | 32 | |
| Tx Antenna gain | dBi | 15 | | 18 | | 21 | |
| Avg.antenna element gain | dBi | 4.5 | | | | | |
| antenna roll-off loss vs frequency | dB | -1 | | | | | |
| Realized antenna array gain | dBi | 12.5 | | 15.5 | | 18.5 | |
| Polarization gain | dB | 2.5 | | | | | |
| IL | dB | 8 | | | | | |

FIG. 11

|  | Unit | Related requirements | | | | | |
|---|---|---|---|---|---|---|---|
| Distance | m | 300 | 200 | 300 | 320 | 300 | 500 |
| EIRP | dBm | 32 | 28 | 29 | 31 | 26 | 34 |
| Tx Power | dBm | 25 | 21 | 19 | 21 | 13 | 21 |
| Pout per element | dBm | 16 | 12 | 10 | 12 | 4 | 12 |
| # of antennas in array |  | 8 | | | | | |
| Tx Antenna gain | dBi | 15 | | 18 | | 21 | |
| Avg.antenna element gain | dBi | 4.5 | | 7.5 | | 10.5 | |
| antenna roll-off loss vs frequency | dB | -1 | | | | | |
| Realized antenna array gain | dBi | 12.5 | | 15.5 | | 18.5 | |
| Polarization gain | dB | 2.5 | | | | | |
| IL | dB | 8 | | | | | |

FIG. 12

| | Unit | Related requirements | | | | | | | |
|---|---|---|---|---|---|---|---|---|---|
| Distance (SNR=6dB) | m | 300 | 200 | 300 | 420 | 400 | 300 | 500 | 800 |
| Realized antenna array gain | dBi | 12.5 | | | 15.5 | | | 18.5 | |
| EIRP | dBm | 32 | 28 | 29 | 31 | 34 | 26 | 34 | 40 |
| REFSENS | dBm | -91.73 | | | -94.73 | | | -97.73 | |
| PL (EIRP-REFSENS) | dBm | 123.73 | 119.73 | 123.73 | 125.73 | 128.73 | 123.73 | 131.73 | 137.73 |
| Distance (base on REFSENS) | dBm | 377 | 269 | 377 | 441 | 550 | 377 | 674 | 963 |

COMMUNICATION FOR VEHICULAR DEVICE

CROSS-REFERENCE TO RELATED APPLICATIONS

This application is a National Stage application under 35 U.S.C. § 371 of International Application No. PCT/KR2021/008652, filed on Jul. 7, 2021, which claims the benefit of Korean Patent Application No. 10-2020-0089895, filed on Jul. 20, 2020. The disclosures of the prior applications are incorporated by reference in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Recently, frequency range around 60 GHz (e.g. frequency range including 63 GHz) has been discussed to be used for communication based on NR. For example, a vehicular User Equipment (UE) may perform communication based on an operating band including the frequency range around 60 GHz.

However, conventionally. Radio Frequency (RF) requirements for the frequency band around 60 GHz (e.g. frequency band including 63 GHz) has not been defined. For example, RF requirements for reception (e.g. vehicular UE RF reference sensitivity requirements, spherical coverage, etc.) based on the frequency band around 60 GHz (e.g. frequency band including 63 GHz) is not defined.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a UE in a wireless communication system, the UE comprising: at least one transceiver; at least one processor; and at least one computer memory operably connectable to the at least one processor and storing instructions that, based on being executed by the at least one processor, perform operations comprising: receiving downlink signal from a base station, wherein power class of the UE is power class X, which is for a vehicular UE configured to use an operating band including frequency range over 60 GHz, wherein the frequency range around 60 GHz is included in a frequency range of 52.6 GHz to 71 GHz, wherein the at least one transceiver is configured to satisfy a RF requirement for the power class X, wherein the RF requirement for the power class X includes at least one of EIS spherical coverage, or a reference sensitivity.

In accordance with an embodiment of the present disclosure, a disclosure of the present specification provides a method for performing communication, the method performed by a UE, the method comprising: receiving downlink signal from a base station, wherein power class of the UE is power class X, which is for a vehicular UE configured to use an operating band including frequency range over 60 GHz, wherein the frequency range around 60 GHz is included in a frequency range of 52.6 GHz to 716 Hz, wherein the at least one transceiver is configured to satisfy a RF requirement for the power class X, wherein the RF requirement for the power class X includes at least one of EIS spherical coverage, or a reference sensitivity.

In accordance with an embodiment of the present disclosure, a disclosure of the present specification provides a wireless device operating in a wireless communication system, the wireless device comprising: at least processor; and at least one computer memory operably connectable to the at least one processor, wherein the at least one processor is configured to perform operations comprising: obtaining downlink signal from a base station, wherein power class of the wireless device is power class X, which is for a vehicular wireless device configured to use an operating band including frequency range over 60 GHz; wherein the frequency range around 60 GHz is included in a frequency range of 52.6 GHz to 71 GHz, wherein at least one transceiver of the wireless device is configured to satisfy a RF requirement for the power class X, wherein the RF requirement for the power class X includes at least one of EIS spherical coverage, or a reference sensitivity.

In accordance with an embodiment of the present disclosure, a disclosure of the present specification provides at least one CRM storing instructions that, based on being executed by at least one processor, perform operations comprising: obtaining downlink signal from a base station, wherein power class of the wireless device is power class X, which is for a vehicular wireless device configured to use an operating band including frequency range over 60 GHz, wherein the frequency range around 60 GHz is included in a frequency range of 52.6 GHz to 71 GHz, wherein at least one transceiver of the wireless device is configured to satisfy a RF requirement for the power class X, wherein the RF requirement for the power class X includes at least one of EIS spherical coverage, or a reference sensitivity.

According to a disclosure of the present disclosure, the above problem of the related art is solved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 7 is examples of the Required EIRP with assumption of Antenna Gain={15 dBi, 18 dBi or 21 dBi} and IL=7 dB.

FIG. 9 illustrates examples of Tx Antenna Gain and Tx Power for Required EIRP.

FIG. 10 shows examples of the related requirement based on average antenna element gain of 4.5 dBi.

FIG. 11 shows examples of the related requirement based on 8 antennas in array.

FIG. 12 shows examples of communication distance between vehicles based on EIRP and REFSENS.

DETAILED DESCRIPTION

Figure 1:
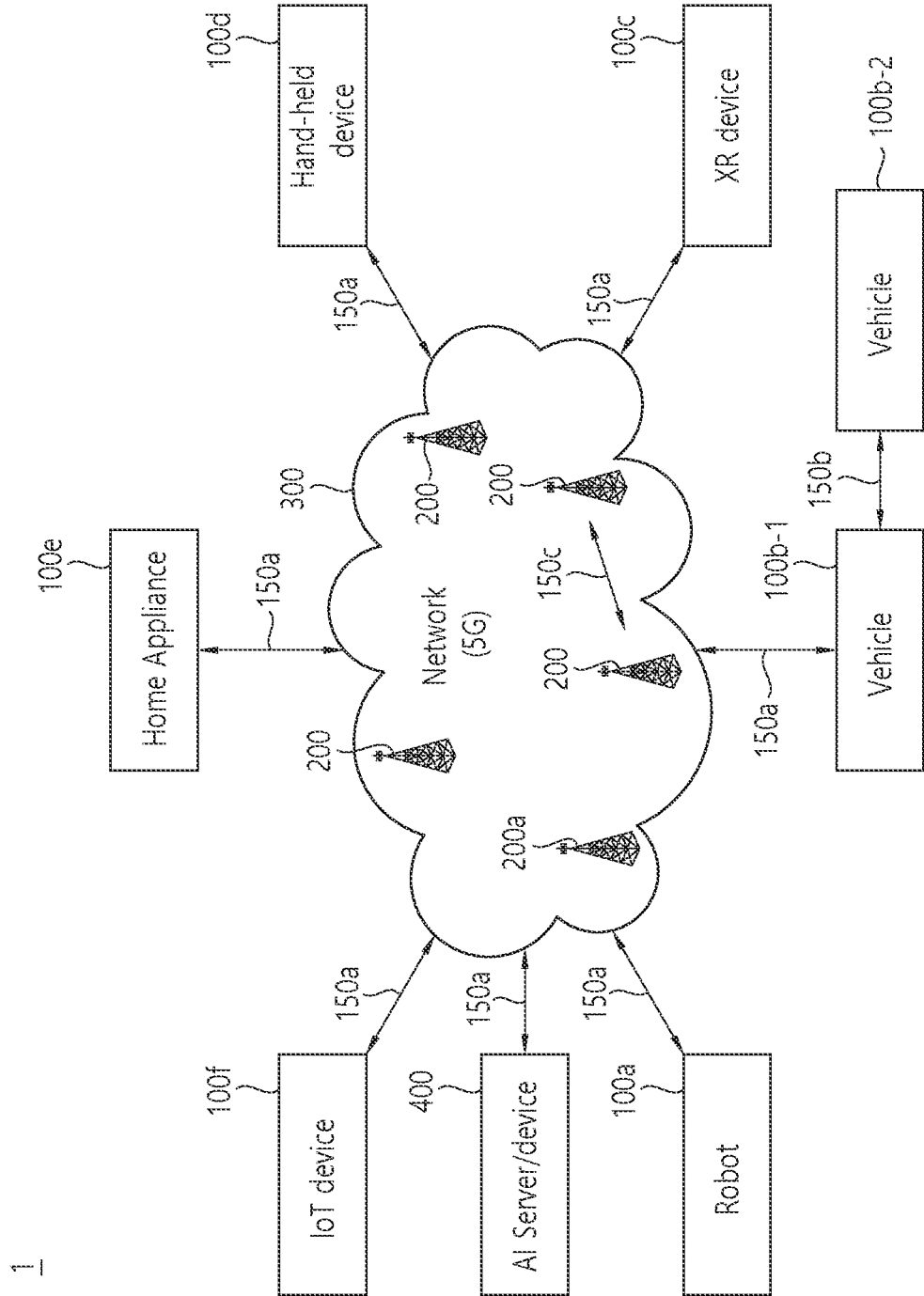
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although user equipment (UE) is illustrated in the accompanying drawings by way of example, the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless apparatus) capable of wireless communication. An operation performed by the UE may be performed by a wireless communication device. A wireless communication device may also be referred to as a wireless device, a wireless device, or the like.

A base station, a term used below, generally refers to a fixed station that communicates with a wireless device. The base station may be referred to as another term such as an evolved-NodeB (eNodeB), an evolved-NodeB (eNB), a BTS (Base Transceiver System), an access point (Access Point), gNB (Next generation NodeB), etc.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (ICPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4)

LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
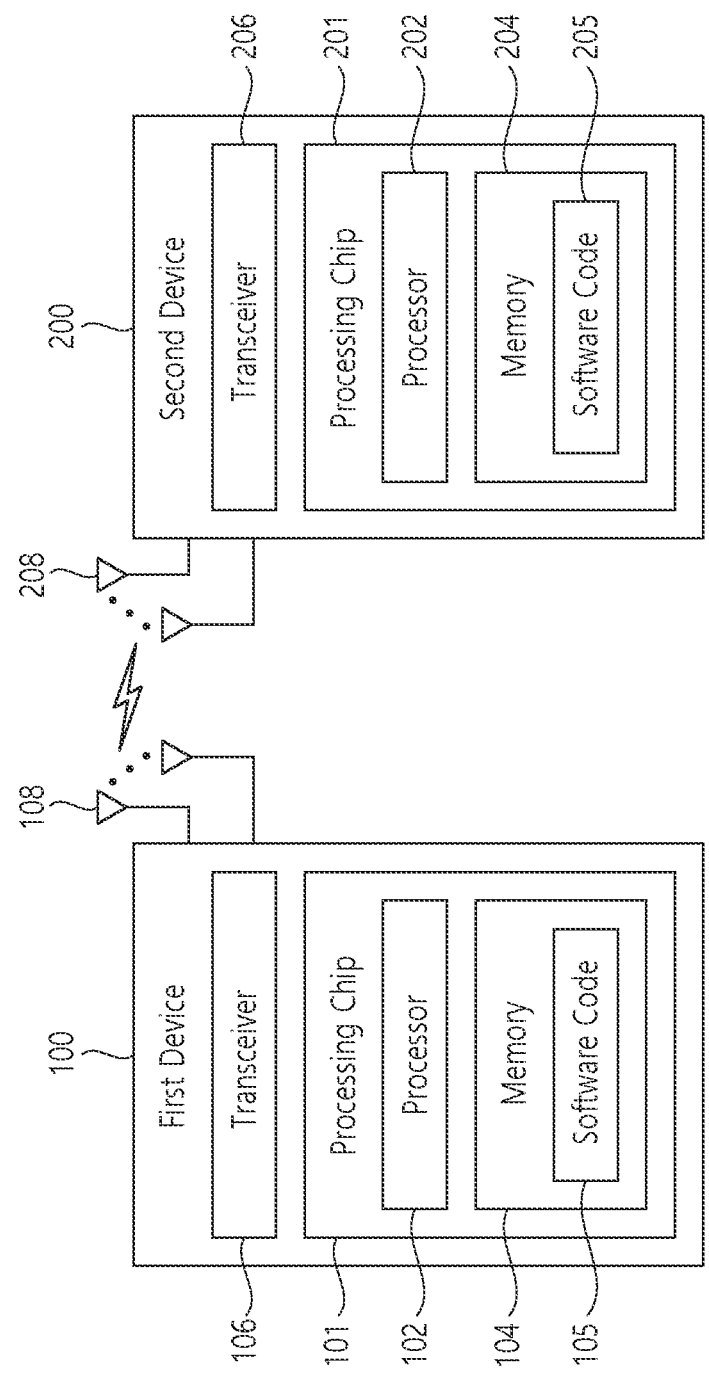
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g. LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 101 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
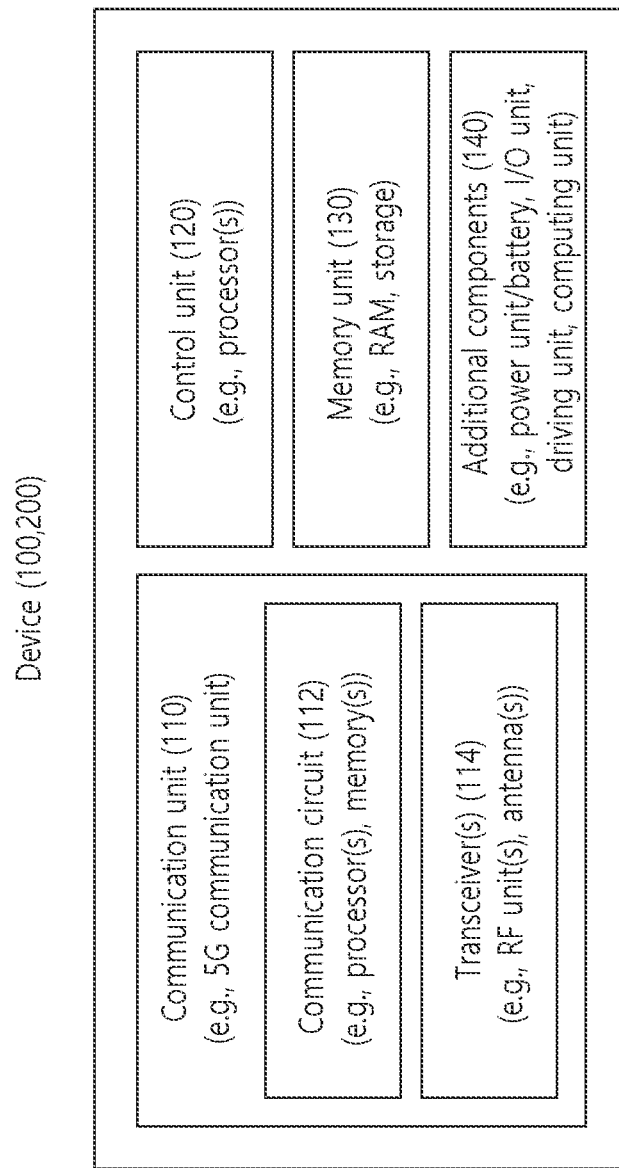
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video 110 port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Disclosure of the Present Specification

Standard requirements for a NR vehicular UE operating based on the frequency band around 60 GHz (e.g. 52.6 GHz-71 GHz, frequency band including 63 GHz) is not currently determined. Hereinafter, the frequency band around 60 GHz may mean frequency band included in a frequency range of 52.6 GHz-71 GHz. "frequency band around 60 GHz" and "frequency band including 63 GHz" are used as examples for representing the frequency band included in the frequency range of 52.6 GHz-71 GHz.

The disclosure of the present specification provides overall receive RF requirements for the NR vehicular UE operating based on the frequency band around 60 GHz (e.g. frequency band including 63 GHz). For example, the overall receive RF requirements may include reference sensitivity, effective isotropic sensitivity (EIS) spherical coverage, etc.

For providing the RF requirements for the frequency band around 60 GHz (e.g. frequency band including 63 GHz), it is necessary to first look at the link budget considering the Intelligent Transport System (ITS) application in the frequency band around 60 GHz (e.g. frequency band including 63 GHz), global regulation, and channel characteristics.

Hereinafter, frequency band including 63 GHz is used as an example of the frequency band around 60 GHz. That is, following descriptions related to frequency band including 63 GHz written in the present specification may be applied to the frequency band around 60 GHz in the same way.

1. Overview of ITS at Frequency Band Around 60 GHz (e.g. 63 GHz)

According to EU Electronic Communications Committee (ECC) REPORT 113, the functionality required of a millimetric, high data rate communication system for next-generation transport telematics is that the functionality should support Vehicle to Vehicle (V2V) communication and Rode Side Units (RSU) to Vehicle (R2V) communication in a dynamic traffic environment.

For example, supporting V2V communication and R2V communication in the dynamic traffic environment may include supporting communication in a a traffic environment in a range of weather conditions, supporting communication with communication ranges extending to several hundred meters, supporting capability of providing broadcast, point-to-point and vehicle cluster connectivity, and supporting communication with a user density, up to 330 vehicles per a square km in the urban environment (see ECC Report 23).

Table 3 shows examples of general application groups for ITS at the frequency band including 63 GHz.

TABLE 3

| | Application | Description |
|---|---|---|
| 1 | Automatic Fee Collection (AFC) Access | Charges for use of roads at point of use/allows access to controlled area. |
| 2 | Traffic Information | Sends data to car advising of traffic congestion, poor visibility ahead. |
| 3 | Route Guidance | Advises driver on traffic flow problems ahead and alternative routes. |
| 4 | Traffic monitoring | Gathers information for traffic management. |
| 5 | Parking Management | Enables driver to check ahead on availability of parking and to pre-book. |
| 6 | Freight and Fleet Management | Efficient management of freight and fleet. For example, locates vehicles and transmits nature of cargo to save time at border controls. |

TABLE 3-continued

| Application | Description |
|---|---|
| 7 In car internet/PC mobile office | Provides an internet style access of telematic data |
| 8 Co-operative Driving | Alerts driver to other vehicles' braking, changing lane etc. |
| 9 Platoons/Road trains | Organizes a number of vehicles into convoys. |
| 10 Emergency warning | Alerts driver to sudden manoeuvers or failures of nearby vehicles. |
| 11 Intelligent Intersection Control | Alerts driver to other vehicles at intersections. |
| 12 Feed from radio station | Local, national or international radio stations stream live (only with Node backhaul) or pre-recorded (content on Node) via Nodes. |
| 13 Stolen Vehicle Alarm, tracking and recovery | Unauthorized movement of vehicle (or boat) is detected and authorities alerted. Vehicle is then tracked for recovery. |

Technical descriptions for ITS are described hereinafter referring to an example of FIG. 4 and an example of Table 4. The following drawings are prepared to explain a specific example of the present specification. Since the names of specific devices or names of specific signals/messages/fields described in the drawings are provided by way of example, technical features of the present specification are not limited to specific names used in the following drawings.

Figure 4:
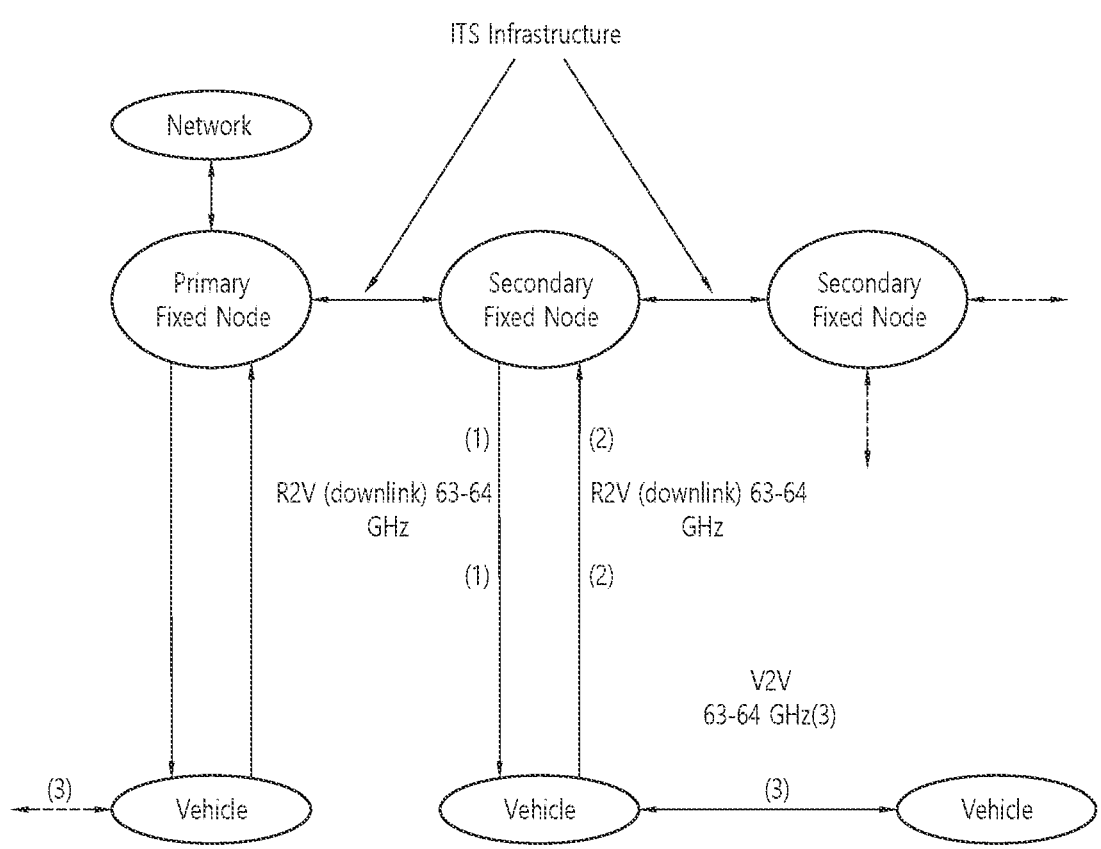
FIG. 4 illustrates an example of possible architecture of ITS network.

FIG. 4 illustrates an example of possible architecture of ITS network.

Refer to FIG. 4, a frequency band with a frequency range of 63 GHz to 64 GHz is drawn as an example of the frequency band including 63 GHz. Fixed nodes in FIG. 4 may be RSU and/or a base station (e.g. gNB, eNB, etc.)

According to FIG. 4, ITS infrastructure may exist between fixed nodes in ITS network. In ITS network, various kinds of communication may be performed. For example, (1) R2V communication (uplink) based on the frequency band including 63 GHz may be performed by the fixed node and a vehicle (vehicular UE), (2) R2V communication (downlink) based on the frequency band including 63 GHz may be performed by the fixed node and a vehicle (vehicular UE), and (3) V2V communication based on the frequency band including 63 GHz may be performed by vehicles (vehicular UEs).

For reference, European Telecommunications Standards Institute (ETSI) Technical Report (TR) 102 400 provides technical details for ITS in the frequency range including 63 GHz. Table 4 shows an example of ITS characteristics.

TABLE 4

| Parameter | Values/Characteristics |
|---|---|
| Frequency | 63 GHz |
| EIRP | 40 dBm |
| Antenna gain of RSU | 23 dBi (1) |
| Antenna gain of Vehicle (V2V, V2R) | 21 dBi (3) for V2V, 14 dBi (2) for V2R |
| Range | typically up to 300 m |
| Noise Figure (NF) | 10 dB |
| Noise floor @ 50 MHz | −87 dBm (Note) |
| SNR (Link budget) | 6 dB |

Note:
Noise floor = −174 dBm (kT) + 10log10 (RxBW) + NF

In Table 4, "(1)" may mean the R2V communication (uplink) based on the frequency band including 63 GHz may be performed by the fixed node and a vehicle (vehicular UE) shown in FIG. 4, "(2)" may mean R2V communication (downlink) based on the frequency band including 63 GHz may be performed by the fixed node and a vehicle (vehicular UE) shown in FIG. 4, and "(3)" may mean V2V communication based on the frequency band including 63 GHz may be performed by vehicles (vehicular UEs) shown in FIG. 4.

In Table 4, RxBw may mean receiving bandwidth (BW). EIRP may mean Equivalent (or Effective) Isotropic Radiated Power. SNR may mean Signal to Noise Ratio.

2. Regulation on Frequency Band Around 60 GHz (e.g. 63 GHz)

There are regulation for communication based on the frequency band around 60 GHz (e.g. 63 GHz). The followings are exemplary regulations.

1) Federal Communications Commission (FCC) Rules

The FCC revised its rules for the license-free/unlicensed millimeter wave 60 GHz band in 2016. This band is referred to as the 57-71 GHz band in section 15.255 of the FCC's rules (FCC, 2016). FCC Rules are defined as the following examples:

Average emitted Equivalent (or Effective) Isotropic Radiated Power (EIRP) must not exceed 40 dBm (10 W); and Peak power of any emission must not exceed 43 dBm (20 W) EIRP, as measured during a transmission interval.

2) European Telecommunications Standards Institute (ETSI) Standard

The ETSI EN 305 550 standard for the unlicensed 60 GHz band, ETSI EN 305 550 V2.1.0 [ETSI 2014a, 2014b] is defined.

The EN 305 550 standard includes three restrictions with which a short range miniature radar system must comply. Two restrictions relate to a mean radiated power, and one relates to a mean power spectral density as the following example:

The mean radiated EIRP must not exceed 100 mW (20 dBm).

The mean transmission output power must not exceed 10 mW (10 dBm).

The mean transmission output power spectral density must not exceed 13 dBm/MHz EIRP.

3. Link Budget Frequency Band Around 60 GHz (e.g. 63 GHz)

Communication along boresight of a directional antenna is considered. To address link budget, path loss and Oxygen absorption may be considered as the following example:

Path Loss (PL)=20 log $10(d_{km})$+20 log $10(fc_{MHz})$+32.44 (dB)

Oxygen absorption=10 dB/Km.

Figure 5:
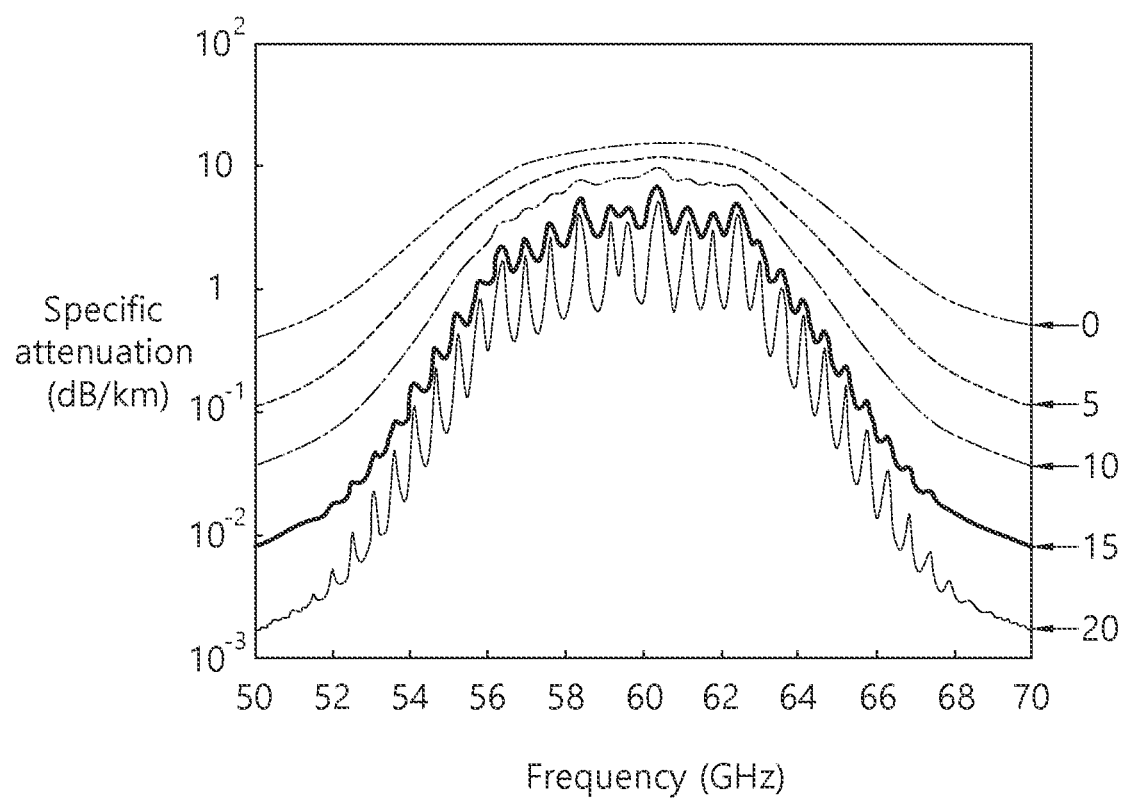
FIG. 5 illustrates an example of Oxygen Attenuation for different altitudes.

FIG. 5 shows an example of Oxygen Attenuation based on an unit of dB/km.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 5 illustrates an example of Oxygen Attenuation for different altitudes.

In FIG. 5, 0, 5, 10, 15, 20 at the right side mean different altitudes. For example, 0 means 0 km, 5 means 5 km, 15 means 15 km, 20 means 20 km. Signal transmitted based on a frequency range of 50 GHz to 70 GHz is reduced in signal size by oxygen (e.g. oxygen included in water molecules) in the atmosphere. The magnitude of the reduction is defined in dB per km and varies with altitude. Referring to FIG. 5, based on that "Oxygen absorption=10 dB/Km", when altitude is 0 km and distance for signal transmission/reception is 300 m, Oxygen attenuation of 3 dB is derived. That is, Oxygen attenuation=3 dB @300 m.

Required EIRP for frequency band around 60 GHz (e.g. 63 GHz) may be determined based on "Required EIRP=Wanted Rx Signal Level @ Air+PL+Oxygen Attenuation". To determine Required EIRP, the following parameters and assumptions may be considered.

When the followings may be assumed:
Rx Bandwidth=50 MHz;
Rx SNR=6 dB;
Noise Floor=−87 dBm a 50 MHz; and
Distance between two vehicles=300 m.
Wanted Rx Signal Level @ RF may be:
Target Rx Signal (a) RF=−81 dBm.
Wanted Rx Signal Level @ Air may be:
Target Rx Signal @ Air=Target Rx Signal (dRF−Rx Antenna Gain(Grx)+ImplementationLoss(IL)=−81 dBm−Grx+IL.
Path loss and Oxygen attenuation at distance of 300 m may be:
PL=118 dB @ 300 m
Oxygen attenuation=3 dB @300 m.
In a result, the required EIRP may be:
Required EIRP=Wanted Rx Signal Level @ Air+PL+ Oxygen Attenuation={−81−Grx+IL}+118+3=40 dBm−Grx+IL.

Figure 6:
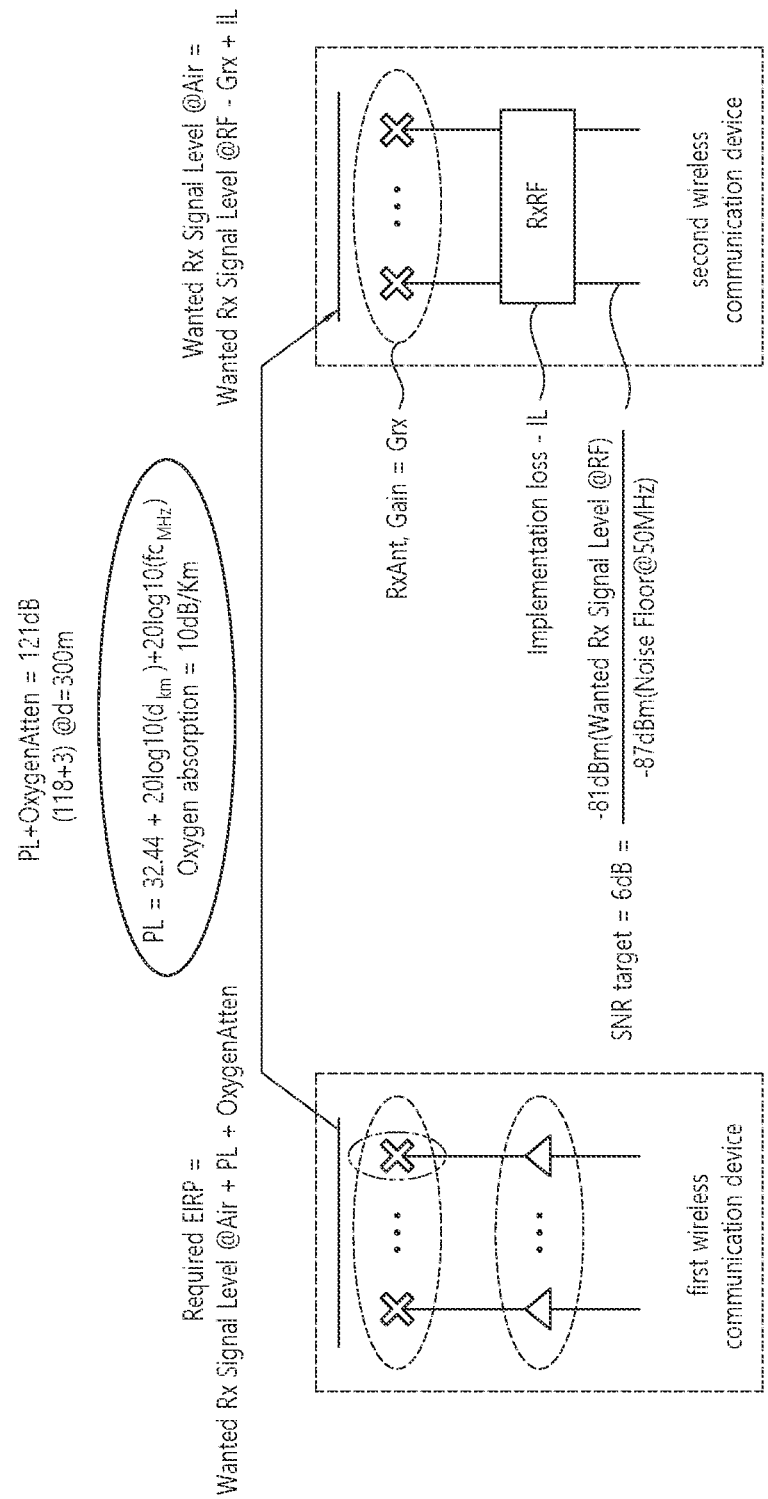
FIG. 6 shows an example of Link budget for frequency band around 60 GHz (e.g. 63 GHz).

FIG. 6 shows a detailed example of Link budget.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 6 shows an example of Link budget for frequency band around 60 GHz (e.g. 63 GHz).

In FIG. 6, a first wireless communication device transmits signal to a second wireless communication device. Both the first wireless communication device and the second wireless communication device perform communication based on the frequency band around 60 GHz (e.g. 63 GHz).

As explained in the above assumptions. Rx Bandwidth may be 50 MHz, Rx SNR (SNR target in FIG. 6) may be 6 dB, Noise Floor may be −87 dBm a 50 MHz, Distance between two vehicles may be 300 m.

Based on that Rx SNR (SNR target in FIG. 6) is 6 dB and Noise Floor is −87 dBm @50 MHz, Wanted Target Rx Signal @; RF may be −81 dBm as shown in FIG. 6. Wanted Rx Signal Level @ Air (Target Rx Signal @ Air) may be Target Rx Signal @ RF−Rx Antenna Gain(Grx)+ImplementationLoss(IL)=−81 dBm−Grx+IL.

As explained in above mentioned examples, PL may be 118 dB at 300 m, Oxygen attenuation may be 3 dB at 300 m.

Required EIRP may be Wanted Rx Signal Level @ Air+PL+Oxygen Attenuation. That is, required EIRP=Wanted Rx Signal Level @ Air+PL+Oxygen Attenuation={−81−Grx+IL}+118+3=40 dBm−Grx+IL.

Thus, Required EIRP may be 40 dBm−Grx+IL.

The following FIG. 7 shows examples of the Required EIRP with assumption of Antenna Gain={15 dBi, 18 dBi or 21 dBi} and IL=7 dB for different distance between vehicles.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 7 is examples of the Required EIRP with assumption of Antenna Gain={15 dBi, 18 dBi or 21 dBi} and IL=7 dB.

As shown in FIG. 7, Rx Antenna gain is assumed to be 15 dBi, 18 dBi or 21 dBi. IL is assumed to be 7 dB.

As explained above referring to FIG. 6, Wanted Rx Signal Level @ Air (Target Rx Signal @ Air) may be Target Rx Signal @RF−Rx Antenna Gain(Grx)+ImplementationLoss (IL)=−81 dBm−Grx+IL. Herein, Grx may be 15 dBi, 18 dBi or 21 dBi and IL may be 7 dB. Thus, Wanted Rx Signal Level @ Air may be −89 dBm for 15 dBi of Grx, Wanted Rx Signal Level @ Air may be −92 dBm for 18 dBi of Grx, Wanted Rx Signal Level @ Air may be −95 dBm for 21 dBi of Grx.

As explained above referring to FIG. 6, Required EIRP may be Wanted Rx Signal Level @ Air+PL+Oxygen Attenuation. In FIG. 7, Required EIRP based on combinations of distances, such as 100 m, 200 m, 300 m, 500 m, 700 m, 1000 m, and Rx antenna gain, such as 15 dBi, 18 dBi, 21 dBi. For example, in case that distance between vehicles is 100 m, the Required EIRP may be 20 dBm for Rx antenna gain of 15 dBi, the Required EIRP may be 17 dBm for Rx antenna gain of 18 dBi, the required EIRP may be 14 dBm for Rx antenna gain of 21 dBi.

The following drawings are prepared to explain a specific example of the present specification. Since the names of specific devices or names of specific signals/messages/fields described in the drawings are provided by way of example, technical features of the present specification are not limited to specific names used in the following drawings.

Figure 8:
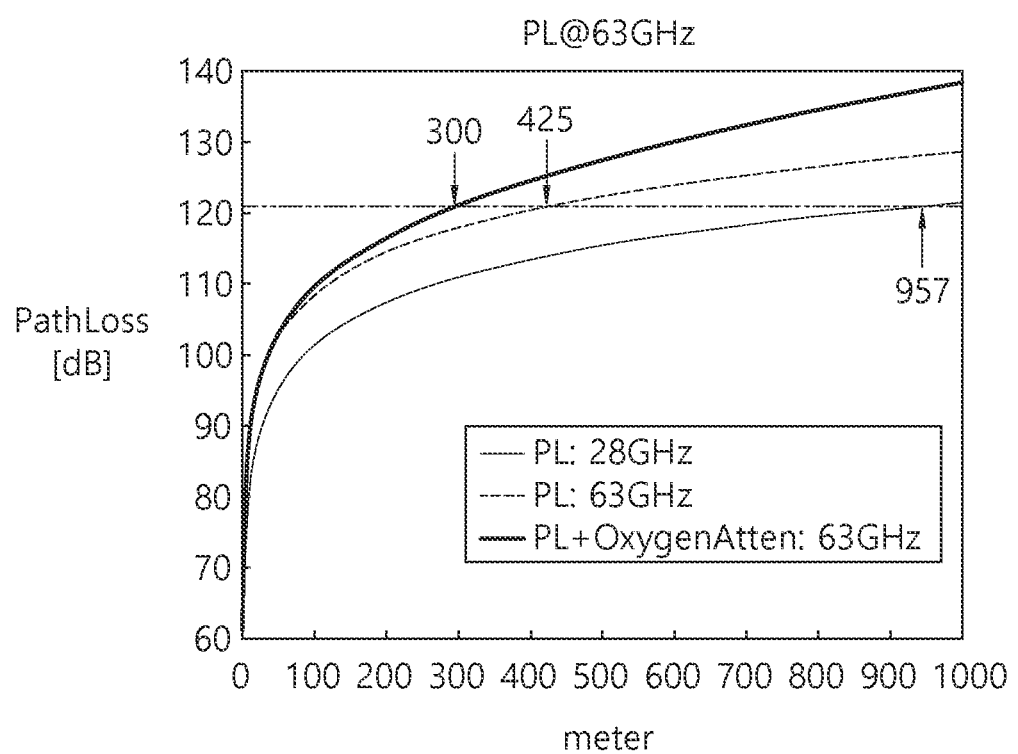
FIG. 8 shows examples of Pathloss according to distances.

FIG. 8 shows examples of Pathloss according to distances.

FIG. 8 shows examples of different distance for the same pathloss value between vehicles for 28 GHz and 63 GHz. Reference point is 300 m at frequency band including 63 GHz with Oxygen attenuation. If assuming same Antenna Gain and same Tx power, communication distance at 63 GHz is reduced by about 650 m compared to 28 GHz. It is because pathloss value at 957 m for a vehicle using frequency band including 28 GHz is equal to pathloss value at 300 m for a vehicle using frequency band including 63 GHz with consideration of Oxygen attenuation.

The required EIRP shown in the examples of FIG. 7 can be gotten with summation of Tx Antenna Gain and Tx Power as seen in examples of FIG. 9.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 9 illustrates examples of Tx Antenna Gain and Tx Power for Required EIRP.

Required EIRP may be determined based on "Required EIRP=Tx Antenna Gain(Gtx)+Tx Power−Implementation Loss".

Herein, Tx Antenna Gain may be determined based on "Tx Antenna Gain=Realized antenna array gain+polarization gain".

Herein, Realized antenna array gain may be determined based on "Realized antenna array gain=Average antenna element gain+antenna roll-off loss vs frequency+10 $\log_{10}$(# of antenna in array). "#" may mean number. That is. # of antenna in array may mean a number of antenna in the array.

Polarization gain may be assumed to be 2.5 dB in FIG. 9.

Tx Power may be determined based on "Tx Power=Pout per element+10 $\log_{10}$(# of antenna in array)". Pout may mean output power.

Implementation Loss(IL) may be determined based on "Implementation Loss(IL)=Mismatch and transmission line loss including load pull+Beam forming loss(phase shifter and amplitude error)+Finite beam table+Beam forming loss (one beam table fits all)+Form-factor integration losses". IL is assumed to be 8 dB in FIG. 9.

To guarantee up to 300 m (as shown in the example of Table 4) as communication range of ITS based on the analysis in "1. Overview of ITS at frequency band around 60 GHz (e.g. 63 GHz)", the required EIRP may be determined to be the following examples:

32 dBm (Required EIRP=Tx Antenna Gain of 15 dBi+Tx Power of 25 dBm–IL(8))

29 dBm (Required EIRP=Tx Antenna Gain of 18 dBi+Tx Power of 19 dBm–IL(8))

26 dBm (Required EIRP=Tx Antenna Gain of 21 dBi+Tx Power of 13 dBm–IL(8))

In the above examples Tx Antenna gain is assumed to be equal to Rx antenna gain (e.g. 15 dBi, 18 dBi, 21 dBi).

FIG. 10 shows examples of the related requirement in order to guarantee the expected (or required) EIRP for distances (200 m, 300 m, 400 m, 800 m) when using average antenna element gain of 4.5 dBi. 32 dBm, 29 dBm, 26 dBm are exmples of Required EIRP for 300 m derived from FIG. 7.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 10 shows examples of the related requirement based on average antenna element gain of 4.5 dBi.

In examples of FIG. 10, Required EIRP may be determined based on "Required EIRP=Tx Antenna Gain(Gtx)+Tx Power—Implementation Loss". Tx Antenna Gain may be determined based on "Tx Antenna Gain=Realized antenna array gain+polarization gain". Realized antenna array gain may be determined based on "Realized antenna array gain=Average antenna element gain+antenna roll-off loss vs frequency+10 $\log_{10}$(# of antenna in array). Tx Power may be determined based on "Tx Power=Pout per element+10 $\log_{10}$(# of antenna in array)". For reference, related requirements for distance of 200 m, 400 m, 800 m are additional examples of analysis other than related requirements for distance of 300 m.

FIG. 11 shows examples of the related requirement in order to guarantee the expected (or required) EIRP for distances (200 m, 300 m, 320 m, 500 m) when using 8 antennas in array. 32 dBm, 29 dBm, 26 dBm are examples of Required EIRP for 300 m derived from FIG. 7.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 11 shows examples of the related requirement based on 8 antennas in array.

In examples of FIG. 11, Required EIRP may be determined based on "Required EIRP=Tx Antenna Gain(Gtx)+Tx Power–Implementation Loss". Tx Antenna Gain may be determined based on "Tx Antenna Gain=Realized antenna array gain+polarization gain". Realized antenna array gain may be determined based on "Realized antenna array gain=Average antenna element gain+antenna roll-off loss vs frequency+10 $\log_{10}$(# of antenna in array). Tx Power may be determined based on "Tx Power=Pout per element+10 $\log_{10}$(# of antenna in array)". For reference, related requirements for distance of 200 m, 320 m, 500 m are additional examples of analysis other than related requirements for distance of 300 m.

Based on the analysis explained above with various examples, the disclosure of the present specification specifies UE Receive RF requirements.

4. Receiver Characteristics

Unless otherwise stated, the receiver characteristics are specified over the air (OTA). The reference receive sensitivity (REFSENS) is defined based on assuming a 0 dBi reference antenna located at the center of the quiet zone.

For Diversity characteristics, the minimum requirements on effective isotropic sensitivity (EIS) may be applied to two measurements, corresponding to DL signals in orthogonal polarizations.

Hereinafter, Reference sensitivity is explained.

The reference sensitivity power level (REFSENS) may be defined as the EIS level at the centre of the quiet zone in the RX beam peak direction, at which the throughput shall meet or exceed the requirements for the specified reference measurement channel.

For defining the reference sensitivity power level (REFSENS) of a vehicular UE performing communication based on a frequency band around 60 GHz, power class 'X' for vehicular UE at the frequency band around 60 GHz is assumed to be used. Herein, power class 'X' may mean a power class for vehicular UE performing communication based on an operating band including the frequency range around 60 GHz (e.g. frequency range included in 52.6 GHz~71 GHz, frequency band including 63 GHz).

To figure out requirements related to the reference sensitivity power level (REFSENS) for power class 'X', the following equation may be used. REFSENS=−174 dBm (kT)+10 log 10(Max.RxBW)+NF−Total antenna Gain−diversity gain+SNR+IL. SNR may mean Signal to Noise Ratio. IL may mean Implementation Loss. Max.RxBW may mean maximum receiving bandwidth.

The following table 5 shows examples of REFSENS which are derived with the above equation for different total antenna gain.

TABLE 5

| Parameter | Unit | Freq. Range around 60 GHz | | |
|---|---|---|---|---|
| kTB/Hz | dBm | −174 | | |
| 10log10 (Rx BW) | dB | 76.77 | | |
| Total antenna Gain (Effective realized antenna array gain) | dB | 12.5 | 15.5 | 18.5 |
| Diversity Gain | dB | 0 | | |
| SNR | dB | −1 | | |
| NF | dB | 10 | | |
| Total implementation loss | dB | 9 | | |
| Sensitivity EIS (REFSENS) | dBm | −91.73 | −94.73 | −97.73 |

Table 5 shows examples of REFSENS based on different values of the Total antenna Gain (Effective realized antenna array gain) (e.g. 12.5 dB, 15.5 dB, 18.5 dB) and the equation "REFSENS=−174 dBm(kT)+10 log 10(Max.RxBW)+NF−Total antenna Gain−diversity gain+SNR+IL".

In examples of table 5, total antenna gain is assumed as effective realized antenna array gain, 12.5 dBm, 15.5 dBm and 18.5 dBm as seen in examples of FIG. 10 and FIG. 11.

In Table 8, Max.RxBW may mean maximum receiving Bandwidth. Max.RxBW may be assumed to be 47.52 MHz (SCS 60 kHz in CBW of 50 MHz). NF may mean Noise Figure. Total implementation loss is assumed to be a value which is 1 dB higher than IL of Tx Part. Herein, IL of Tx Part may be 8 dB. Herein, total implementation loss (IL) may be determined by adding 1 dB to IL of Tx Part (8 dB). That is, total IL for reception=IL of Tx Part (8 dB)+1 dB.

For effective realized antenna array gain, corresponding EIRP values in examples of FIG. 10 and FIG. 11 are considered. From set of {EIRP, REFSENS}, Path Loss from EIRP to REFSENS may be derived.

Path Loss from EIRP to REFSENS may mean "EIRP (e.g. EIRP of first wireless communication device of FIG. 6)−REFSENS (e.g. REFSENS of second wireless communication device of FIG. 6)=Path Loss". For example, with reference to the example of FIG. 6, first wireless communication device may transmit signal based on a transmission power X dBm (EIRP), and second wireless communication device receives signal based on a signal level of REFSENS. Based on this exemplary situation, Path Loss from EIRP to REFSENS (EIRP−REFSENS=Path Loss) may be derived. Assuming that Path Loss from EIRP to REFSENS is equal to "free space Path Loss+Oxygen absorption", the communication range of distance between vehicles can be derived as examples of FIG. 12.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 12 shows examples of communication distance between vehicles based on EIRP and REFSENS.

FIG. 12 shows examples of Communication distance between vehicles from EIRP and REFSENS a frequency band around 60 GHz.

As explained above, Path Loss from EIRP to REFSENS is equal to "free space Path Loss+Oxygen absorption". That is, the following equation is derived. PL_fromEIRP_toREFSENS=PL_freespace+Oxygen absorption. Herein, PL_fromEIRP_toREFSENS may mean Path Loss from EIRP to REFSENS. PL_freespace may mean free space Path Loss.

Also, Path Loss from EIRP to REFSENS is equal to "EIRP−REFSENS". The following equation is derived. PL_fromEIRP_toREFSENS=EIRP−REFSENS.

Based on analysis of "3. Link budget frequency band around 60 GHz (e.g. 63 GHz)", PL_freespace is equal to "20 $\log_{10}(d_{km})$+20 $\log_{10}(fc_{MHz})$+32.44 (dB)". Oxygen absorption is equal to 10 dB/Km.

Thus, the following equation is derived. "PL_freespace+Oxygen absorption=20 $\log_{10}$(d_km)+20 log 10(fc_MHz)+32.44 (dB)+10 dB/Km".

Based on the above equation "PL_freespace+Oxygen absorption=20 log 10(d_km)+20 log 10(fc_MHz)+32.44 (dB)+10 dB/Km", examples of distance based on REFSENS is determined in FIG. 12.

For example, in case of EIRP=32 dBm, REFSENS=−91.73 dBm in FIG. 12, the distance based on REFSENS is derived for 63 GHz(63*1e3 MHz) as follows.

PL(EIRP−REFSENS)=123.73,
PL=20 log 10(d_km)+20 log 10(fc_MHz)+32.44 (dB)+10 dB/Km,
123.73=20 log 10(d_km)+20 log 10(63*1e3)+32.44+10+10 dB/Km
d_km=0.377 km=377 m From FIG. 12, comparing with distance of 300 m based on SNR=6 dB. REFSENS based distance between vehicles is increased up to 377 m (about 25↑). Herein, REFSENS related SNR may be −1 dB. REFSENS based distance may mean distance value considering REFSENS related SNR. Due to the fact that REFSENS related SNR is smaller than "SNR=6 dB". REFSENS based distance is bigger than distance value based on SNR 6 dB.

Comparing with distance of 400 m, 500 ms and 800 m based on SNR=6 dB. REFSENS based distance between vehicles is higher than about 150-170 m (about 35↑). Herein, REFSENS based distance may be maximum distance to be guaranteed for vehicle communication.

Based on the derived REFSENS as seen in examples of Table 5, other channel bandwidth's REFSENS can be calculated.

The throughput shall be ≥95% of the maximum throughput of the reference measurement channels with peak reference sensitivity specified in examples of Table 6 to Table 8 depending on Total antenna Gain. The requirement is verified with the test metric of EIS (Link=Rx Beam peak search grids, Meas=Link Angle). Herein, EIS(Link=Rx Beam peak search grids, Meas=Link angle) means measurement of the EIS of the UE such that the measurement angle is aligned with the Rx Beam peak search grids within an acceptable measurement error uncertainty.

Table 6 shows examples of Reference sensitivity for power class 'X' based on Total antenna Gain (Effective realized antenna array gain) of 12.5 dBi. Hereinafter, operating band "nxxx" may mean an operating band including frequency range around 60 GHz.

TABLE 6

| Operating band | REFSENS (dBm)/Channel bandwidth | | | |
|---|---|---|---|---|
| | 50 MHz | 100 MHz | 200 MHz | 400 MHz |
| nxxx in around 60 GHz | −92.0 ± Δ | −89.0 ± Δ | −86.0 ± Δ | −83.0 ± Δ |

NOTE 1:
Δ = 0~2 dB

In Table 6, REFSENS values are defined based on channel bandwidth and Total antenna Gain (Effective realized antenna array gain) of 12.5 dBi. For reference, examples of REFSENS value in Table 6 to Table 8 are derived from RESENS value of Table 5. As explained above with reference to Table 5, REFSENS values of Table 5 are determined based on Channel bandwidth (CBW) 50 MHz. REFSENS values related to CBW 50 MHz in Table 6 to Table 8 are determined based on rounding off REFSENS values of Table 5 to the nearest whole number. REFSENS values related to CBW 100 MHz, 200 MHz; 400 MHz are determined based on adding 3 dB, 6 dB, 9 dB respectively to REFSENS values related to CBW 50 MHz. For example, 3 dB may be derived based on relationship between 50 MHz and 100 MHz, such as 10 log 10(100/50)=3.

Table 7 shows examples of Reference sensitivity for power class 'X' based on Total antenna Gain (Effective realized antenna array gain) of 15.5 dBi.

TABLE 7

| Operating band | REFSENS (dBm)/Channel bandwidth | | | |
|---|---|---|---|---|
| | 50 MHz | 100 MHz | 200 MHz | 400 MHz |
| nxxx in around 60 GHz | −95.0 ± Δ | −92.0 ± Δ | −89.0 ± Δ | −86.0 ± Δ |

NOTE 1:
Δ = 0~2 dB

In Table 7, REFSENS values are defined based on channel bandwidth and Total antenna Gain (Effective realized antenna array gain) of 15.5 dBi.

Table 8 shows examples of Reference sensitivity for power class 'X' based on Total antenna Gain (Effective realized antenna array gain) of 18.5 dBi.

TABLE 8

| Operating band | REFSENS (dBm)/Channel bandwidth | | | |
|---|---|---|---|---|
| | 50 MHz | 100 MHz | 200 MHz | 400 MHz |
| nxxx in around 60 GHz | −98.0 ± Δ | −95.0 ± Δ | −92.0 ± Δ | −89.0 ± Δ |

NOTE 1:
Δ = 0~2 dB

In Table 7, REFSENS values are defined based on channel bandwidth and Total antenna Gain (Effective realized antenna array gain) of 18.5 dBi.

Requirements related to REFSENS shall be met for an uplink transmission using Quadrature Phase Shift Keying (QPSK) Discrete Fourier Transform (DFT) spread Orthogonal Frequency Division Multiplexing (OFDM) (DFT-s-OFDM) waveforms and for uplink transmission bandwidth less than or equal to that specified in Table 9.

TABLE 9

| Operating band | NR Band/Channel bandwidth/NRB/SCS/Duplex mode | | | | | |
|---|---|---|---|---|---|---|
| | 50 MHz | 100 MHz | 200 MHz | 400 MHz | SCS | Duplex Mode |
| nxxx in around 60 GHz | 32 | 64 | 128 | 256 | 120 kHz | TDD |

Table 9 shows examples of Uplink configuration for reference sensitivity. For example, according to Table 9, 120 kHz of SCS, 32 RB(Resource Block)s and TDD may be used for operating band when 50 MHz of channel bandwidth is configured.

Examples of Uplink configuration in Table 9 may be used for verification of REFSENS. When testing UE with testing device, since DL side cannot be directly verified, the UE may be configured with UL configuration to indirectly verifying REFSENS of UE by sending UL signal including Ack/Nack information for DL reception to the testing device.

Table 10 to Table 13 shows examples of Reference sensitivity for channel bandwidth bigger than 400 MHz and uplink configuration for Reference sensitivity for channel bandwidth bigger than 400 MHz.

The throughput shall be ≥95% of the maximum throughput of the reference measurement channels with peak reference sensitivity specified in examples of Table 10 to Table 12 depending on Total antenna Gain. The requirement is verified with the test metric of EIS (Link=Beam peak search grids, Meas=Link Angle).

Table 10 shows examples of Reference sensitivity for power class 'X' based on Total antenna Gain (Effective realized antenna array gain) of 12.5 dBi.

TABLE 10

| Operating band | REFSENS (dBm)/Channel bandwidth | | | | | |
|---|---|---|---|---|---|---|
| | 800 MHz | 1000 MHz | 1200 MHz | 1600 MHz | 2000 MHz | 2160 MHz |
| nxxx in around 60 GHz | −80.0 ± Δ | −79.0 ± Δ | −78.2 ± Δ | −77.0 ± Δ | −76.0 ± Δ | −75.7 ± Δ |

NOTE 1:
Δ = 0~2 dB

In Table 10, REFSENS values are defined based on channel bandwidth and Total antenna Gain (Effective realized antenna array gain) of 12.5 dBi. Table 11 shows examples of Reference sensitivity for power class 'X' based on Total antenna Gain (Effective realized antenna array gain) of 15.5 dBi.

TABLE 11

| Operating band | REFSENS (dBm)/Channel bandwidth | | | | | |
|---|---|---|---|---|---|---|
| | 800 MHz | 1000 MHz | 1200 MHz | 1600 MHz | 2000 MHz | 2160 MHz |
| nxxx in around 60 GHz | −83.0 ± Δ | −82.0 ± Δ | −81.2 ± Δ | −80.0 ± Δ | −79.0 ± Δ | −78.7 ± Δ |

NOTE 1:
Δ = 0~2 dB

In Table 11, REFSENS values are defined based on channel bandwidth and Total antenna Gain (Effective realized antenna array gain) of 15.5 dBi.

Table 12 shows examples of Reference sensitivity for power class 'X' based on Total antenna Gain (Effective realized antenna array gain) of 18.5 dBi.

TABLE 12

| | REFSENS (dBm)/Channel bandwidth | | | | | |
|---|---|---|---|---|---|---|
| Operating band | 800 MHz | 1000 MHz | 1200 MHz | 1600 MHz | 2000 MHz | 2160 MHz |
| nxxx in around 60 GHz | −86.0 ± Δ | −85.0 ± Δ | −84.2 ± Δ | −83.0 ± Δ | −82.0 ± Δ | −81.7 ± Δ |

NOTE 1:
Δ = 0~2 dB

In Table 12, REFSENS values are defined based on channel bandwidth and Total antenna Gain (Effective realized antenna array gain) of 18.5 dBi.

Requirements related to REFSENS shall be met for an uplink transmission using QPSK DFT-s-OFDM waveforms and for uplink transmission bandwidth less than or equal to that specified in Table 13.

TABLE 13

| | NR Band/Channel bandwidth/NRB/SCS/Duplex mode | | | | | | | |
|---|---|---|---|---|---|---|---|---|
| Operating band | 800 MHz | 1000 MHz | 1200 MHz | 1600 MHz | 2000 MHz | 2160 MHz | SCS | Duplex Mode |
| nxxx in around 60 GHz | 512 | 640 | 768 | 1024 | 1280 | 1382 | 480 kHz | TDD |
| | 1024 | 1280 | 1536 | 2048 | 2560 | 2764 | 960 kHz | |

Table 13 shows examples of Uplink configuration for reference sensitivity. For example, according to Table 13, 480 kHz of SCS, 512 RB(Resource Block)s and TDD may be used for operating band when 800 MHz of channel bandwidth is configured.

Hereinafter, EIS spherical coverage is explained. For example, EIS spherical coverage for power class 'X' is explained below.

The reference measurement channels and throughput criterion are explained in the above examples related to reference sensitivity and reference sensitivity power level.

For maximum EIS(effective isotropic sensitivity) at the Y %-tile of the CCDF (complementary cumulative distribution function) of EIS measured over the full sphere, Y % is proposed as the same 60% which is used in spherical coverage of transmitter characteristics as defined in "5. UE maximum output power". And, it is proposed to reuse the difference of 11 dB between minimum peak EIRP and minimum EIRP at 60%-tile CDF for maximum EIS.

Y %-tile=60%-tile
Maximum EIS at the Y %-tile of the CCDF of EIS=REFSENS(peak EIS)+11 dB The maximum EIS at the 60th percentile of the CCDF of EIS measured over the full sphere around the UE is defined as the spherical coverage requirement and the spherical coverage requirement is defined as examples of Table 14 to Table 16 below. The requirement is verified with the test metric of EIS (Link=Beam peak search grids, Meas=Link angle) depending on Total antenna Gain.

Table 14 shows examples of EIS spherical coverage for power class 'X' based on Total antenna Gain (Effective realized antenna array gain) of 12.5 dBi.

TABLE 14

| Operating band | EIS at 60$^{th}$ %-tile CCDF (dBm)/Channel bandwidth | | | |
|---|---|---|---|---|
| | 50 MHz | 100 MHz | 200 MHz | 400 MHz |
| nxxx in around 60 GHz | −81.0 ± Δ | −78.0 ± Δ | −75.0 ± Δ | −72.0 ± Δ |

NOTE 1:
The transmitter shall be set to $P_{UMAX}$ as defined in clause 3.2 in TS38.101-2 V16.4.0.

NOTE 2:
The EIS spherical coverage requirements are verified only under normal thermal conditions as defined in Annex E.2.1 in TS38.101-2 V16.4.0.

NOTE 3:
Δ = 0~2 dB

In Table 14, EIS at 60th %-tile CCDF values are defined based on channel bandwidth and Total antenna Gain (Effective realized antenna array gain) of 12.5 dBi. Herein, $P_{UMAX}$ may mean measured configured maximum UE output power.

Table 15 shows examples of EIS spherical coverage for power class 'X' based on Total antenna Gain (Effective realized antenna array gain) of 15.5 dBi.

TABLE 15

| Operating band | EIS at 60$^{th}$ %-tile CCDF (dBm)/Channel bandwidth | | | |
|---|---|---|---|---|
| | 50 MHz | 100 MHz | 200 MHz | 400 MHz |
| nxxx in around 60 GHz | −84.0 ± Δ | −81.0 ± Δ | −78.0 ± Δ | −75.0 ± Δ |

NOTE 1:
The transmitter shall be set to $P_{UMAX}$ as defined in clause 3.2 in TS38.101-2 V16.4.0.
NOTE 2:
The EIS spherical coverage requirements are verified only under normal thermal conditions as defined in Annex E.2.1 in TS38.101-2 V16.4.0.
NOTE 3:
Δ = 0~2 dB In Table 15, EIS at 60th %-tile CCDF values are defined based on channel bandwidth and Total antenna Gain (Effective realized antenna array gain) of 15.5 dBi.

Table 16 shows examples of EIS spherical coverage for power class 'X' based on Total antenna Gain (Effective realized antenna array gain) of 18.5 dBi.

TABLE 16

| Operating band | EIS at 60$^{th}$ %-tile CCDF (dBm)/Channel bandwidth | | | |
| --- | --- | --- | --- | --- |
| | 50 MHz | 100 MHz | 200 MHz | 400 MHz |
| nxxx in around 60 GHz | −87.0 ± Δ | −84.0 ± Δ | −81.0 ± Δ | −78.0 ± Δ |

NOTE 1:
The transmitter shall be set to P$_{UMAX}$ as defined in clause 3.2 in TS38.101-2 V16.4.0.
NOTE 2:
The EIS spherical coverage requirements are verified only under normal thermal conditions as defined in Annex E.2.1 in TS38.101-2 V16.4.0.
NOTE 3:
Δ = 0~2 dB In Table 16, EIS at 60th %-tile CCDF values are defined based on channel bandwidth and Total antenna Gain (Effective realized antenna array gain) of 18.5 dBi.

Requirements related to EIS spherical coverage shall be met for an uplink transmission using QPSK DFT-s-OFDM waveforms and for uplink transmission bandwidth less than or equal to that specified in Table 9.

Table 17 to Table 19 shows examples of EIS spherical coverage for channel bandwidth bigger than 400 MHz.

The maximum EIS at the 60th percentile of the CCDF of EIS measured over the full sphere around the UE is defined as the spherical coverage requirement and the spherical coverage requirement is defined as examples of Table 17 to Table 19 below. The requirement is verified with the test metric of EIS (Link=Beam peak search grids, Meas=Link angle) depending on Total antenna Gain.

Table 17 shows examples of EIS spherical coverage for power class 'X' based on Total antenna Gain (Effective realized antenna array gain) of 12.5 dBi.

TABLE 17

| Operating band | EIS at 60$^{th}$ %-tile CCDF (dBm)/Channel bandwidth | | | | | |
| --- | --- | --- | --- | --- | --- | --- |
| | 800 MHz | 1000 MHz | 1200 MHz | 1600 MHz | 2000 MHz | 2160 MHz |
| nxxx in around 60 GHz | −69.0 ± Δ | −68.0 ± Δ | −67.2 ± Δ | −66.0 ± Δ | −65.0 ± Δ | −64.7 ± Δ |

NOTE 1:
The transmitter shall be set to P$_{UMAX}$ as defined in clause 3.2 in TS38.101-2 V16.4.0.
NOTE 2:
The EIS spherical coverage requirements are verified only under normal thermal conditions as defined in Annex E.2.1 in TS38.101-2 V16.4.0.
NOTE 3:
Δ = 0~2 dB In Table 17, EIS at 60th %-tile CCDF values are defined based on channel bandwidth and Total antenna Gain (Effective realized antenna array gain) of 12.5 dBi.

Table 18 shows examples of EIS spherical coverage for power class 'X' based on Total antenna Gain (Effective realized antenna array gain) of 15.5 dBi.

TABLE 18

| Operating band | EIS at 60$^{th}$ %-tile CCDF (dBm)/Channel bandwidth | | | | | |
| --- | --- | --- | --- | --- | --- | --- |
| | 800 MHz | 1000 MHz | 1200 MHz | 1600 MHz | 2000 MHz | 2160 MHz |
| nxxx in around 60 GHz | −72.0 ± Δ | −71.0 ± Δ | −70.2 ± Δ | −69.0 ± Δ | −68.0 ± Δ | −67.7 ± Δ |

NOTE 1:
The transmitter shall be set to P$_{UMAX}$ as defined in clause 3.2 in TS38.101-2 V16.4.0.
NOTE 2:
The EIS spherical coverage requirements are verified only under normal thermal conditions as defined in Annex E.2.1 in TS38.101-2 V16.4.0.
NOTE 3:
Δ = 0~2 dB In Table 18, EIS at 60th %-tile CCDF values are defined based on channel bandwidth and Total antenna Gain (Effective realized antenna array gain) of 15.5 dBi.

Table 19 shows examples of EIS spherical coverage for power class 'X' based on Total antenna Gain (Effective realized antenna array gain) of 18.5 dBi.

TABLE 19

| | EIS at $60^{th}$ %-tile CCDF (dBm)/Channel bandwidth | | | | | |
|---|---|---|---|---|---|---|
| Operating band | 800 MHz | 1000 MHz | 1200 MHz | 1600 MHz | 2000 MHz | 2160 MHz |
| nxxx in around 60 GHz | −75.0 ± Δ | −74.0 ± Δ | −73.2 ± Δ | −72.0 ± Δ | −71.0 ± Δ | −70.7 ± Δ |

NOTE 1:
The transmitter shall be set to $P_{UMAX}$ as defined in clause 3.2 in TS38.101-2 V16.4.0.
NOTE 2:
The EIS spherical coverage requirements are verified only under normal thermal conditions as defined in Annex E.2.1 in TS38.101-2 V16.4.0.
NOTE 3:
Δ = 0~2 dB In Table 19, EIS at 60th %-tile CCDF values are defined based on channel bandwidth and Total antenna Gain (Effective realized antenna array gain) of 18.5 dBi.

Requirements related to EIS spherical coverage shall be met for an uplink transmission using QPSK DFT-s-OFDM waveforms and for uplink transmission bandwidth less than or equal to that specified in Table 13.

5. UE Maximum Output Power

Hereinafter, UE maximum output power requirements for power class 'X' are explained.

The UE maximum output power requirement for power class 'X' may includes the following requirement package:
Minimum peak EIRP;
Maximum Total Radiated Power (TRP);
Maximum EIRP; and
Minimum EIRP at Spherical coverage 'Y'%-tile CDF.

To figure out these requirements, analysis on antenna beam gain at frequency band around 60 GHz (e.g. frequency band including 63 GHz) is needed.

Figure 13:
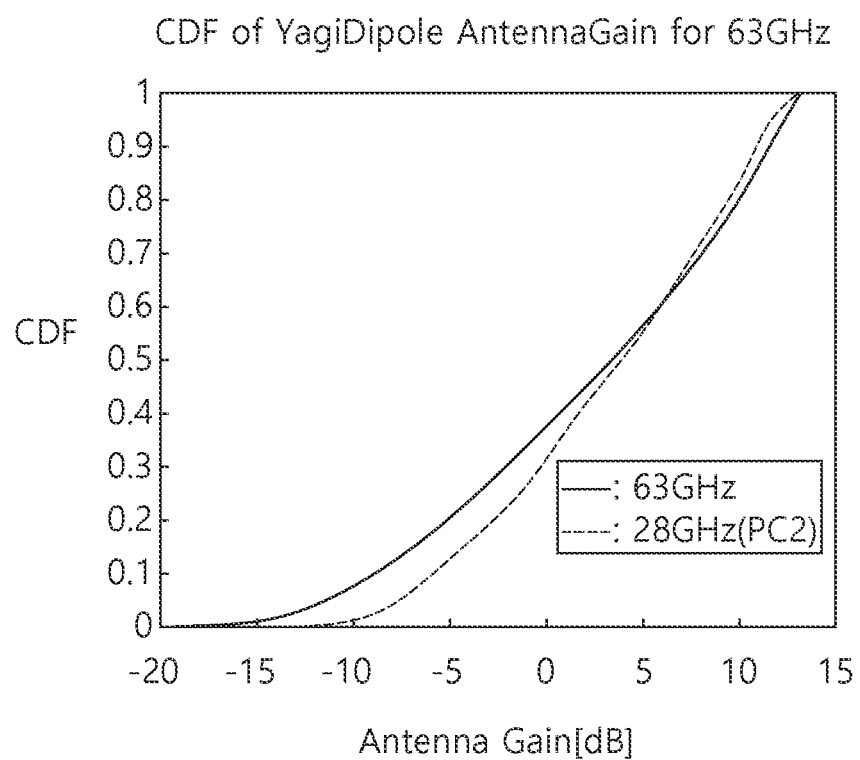
FIG. 13 shows examples of CDF of peak antenna beam gain with 63 GHz based antenna array and CDF of peak antenna beam gain with 28 GHz based antenna array.

FIG. 13 shows an example of CDF of peak antenna beam gain with 63 GHz based antenna array comparing with 28 GHz based antenna array.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 13 shows examples of CDF of peak antenna beam gain with 63 GHz based antenna array and CDF of peak antenna beam gain with 28 GHz based antenna array.

CDF of "28 GHz (PC2)" shows an example of CDF of peak antenna beam gain with 28 GHz based antenna array for PC2 UE.

According to FIG. 13, maximum antenna beam gain is about 13 dB for both 63 GHz based antenna array and 28 GHz (Power Class 2) based antenna array. And, antenna beam gain at CDF of 60%-tile is almost same for both 63 GHz based antenna array and 28 GHz based antenna array. Herein, the CDF of 60%-tile has already specified for PC2.

For spherical coverage, same 60%-tile CDF which is specified for PC2 at 28 GHz is proposed to be reused for power class 'X' at frequency band including 63 GHz. That is, spherical coverage for power class 'X' at frequency band including 63 GHz is based on 60%-tile CDF as the following:

Spherical coverage=60%-tile CDF.

For minimum EIRP for power class 'X' at 60%-tile CDF for frequency band including 63 GHz, it is proposed to reuse the difference of 11 dB between minimum peak EIRP and minimum EIRP at 60%-tile CDF which is specified for power class 2 at 28 GHz.

Figure 14:
FIG. 14 is a flow chart showing an example of a procedure performed by a UE according to the present disclosure.

Hereinafter, FIG. 14 illustrates an example of an operation performed by the UE. Herein, the UE may be a vehicular UE performing communication based on an operating band including the frequency range around 60 GHz (e.g. frequency range included in 52.6 GHz-71 GHz, frequency band including 63 GHz)

The following drawings are prepared to explain a specific example of the present specification. Since the names of specific devices or names of specific signals/messages/fields described in the drawings are provided by way of example, technical features of the present specification are not limited to specific names used in the following drawings.

FIG. 14 is a flow chart showing an example of a procedure performed by a UE according to the present disclosure.

Referring to FIG. 14, steps S1401 is shown. Operations described below may be performed by the UE (for example, the first device 100 of FIG. 2 and device 100 of FIG. 3).

For reference, operations of UE shown in FIG. 14 are examples. That is, the scope of the present specification is not limited by the operations of the UE shown in FIG. 14. The UE may perform operations explained in the present specification even if some of the operation is not shown in the examples of FIG. 14.

For reference, operations of UE shown in FIG. 14 are examples. That is, the scope of the present specification is not limited by the operations of the LIE shown in FIG. 14. The UE may perform operations explained in the present specification even if some of the operation is not shown in the examples of FIG. 14.

In step S1401, the UE may receive signal (e.g. downlink signal) from a base station. At least one transceiver included in the UE is configured to satisfy a Radio Frequency (RF) requirement for the power class X. Herein, the power class X may mean a power class of a vehicular UE performing communication based on an operating band including the frequency range around 60 GHz (e.g. frequency range included in 52.6 GHz-71 GHz, frequency band including 63 GHz).

For example, the RF requirement for the power class X includes at least one of at least one of Effective Isotropic Sensitivity (EIS) spherical coverage, or a reference sensitivity which are explained in examples of the present specification. For example, the RF requirement may include requirements explained in "4. Receiver characteristics" and "5. UE maximum output power" of the present specification.

According to various examples described in the disclosure of the present specification, examples of RF requirements for the frequency band around 60 GHz (e.g. frequency range included in 52.6 GHz-71 GHz, frequency band including 63 GHz) are explained. For example, in various examples described in the disclosure of the present specification, the overview of ITS at frequency band around 60 GHz (e.g. 630 GHz), regulation on frequency band around 60 GHz (e.g. 63 GHz), Link budget frequency band around 60 GHz (e.g. 63 GHz), receiver characteristics and UE maximum output power. For example, according to various examples described in the disclosure of the present specification, RF requirements related to reception (e.g. Effective Isotropic Sensitivity (EIS) spherical coverage, a reference sensitivity, etc.) based on the frequency band around 60 GHz (e.g. frequency range included in 52.6 GHz~71 GHz, frequency band including 63 GHz) are explained.

Hereinafter, an apparatus (for example, UE) in a wireless communication system, according to some embodiments of the present disclosure, will be described.

For example, the apparatus may include at least one processor, at least one transceiver, and at least one transceiver; at least one processor; and at least one computer memory operably connectable to the at least one processor and storing instructions that, based on being executed by the at least one processor, perform operations comprising: receiving downlink signal from a base station, wherein power class of the UE is power class X, which is for a vehicular UE configured to use an operating band including frequency range over 60 GHz, wherein the frequency range around 60 GHz is included in a frequency range of 52.6 GHz to 71 GHz, wherein the at least one transceiver is configured to satisfy a RF requirement for the power class X, wherein the RF requirement for the power class X includes at least one of EIS spherical coverage, or a reference sensitivity.

Hereinafter, a wireless device operating in a wireless communication system, according to some embodiments of the present disclosure, will be described.

For example, the wireless device may include at least one processor, at least one transceiver, and at least one transceiver; at least one processor; and at least one computer memory operably connectable to the at least one processor and storing instructions that, based on being executed by the at least one processor, perform operations comprising: receiving downlink signal from a base station, wherein power class of the UE is power class X, which is for a vehicular UE configured to use an operating band including frequency range over 60 GHz, wherein the frequency range around 60 GHz is included in a frequency range of 52.6 GHz to 71 GHz, wherein the at least one transceiver is configured to satisfy a RF requirement for the power class X, wherein the RF requirement for the power class X includes at least one of EIS spherical coverage, or a reference sensitivity.

Hereinafter, a non-transitory computer-readable medium (CRM) has stored thereon a plurality of instructions in a wireless communication system, according to some embodiments of the present disclosure, will be described.

Hereinafter, At least one computer readable medium (CRM) storing instructions will be described.

For example, a plurality of instruction, based on being executed by at least one processor, perform operations comprising: obtaining downlink signal from a base station, wherein power class of the wireless device is power class X, which is for a vehicular wireless device configured to use an operating band including frequency range over 60 GHz, wherein the frequency range around 60 GHz is included in a frequency range of 52.6 GHz to 71 GHz, wherein at least one transceiver of the wireless device is configured to satisfy a RF requirement for the power class X, wherein the RF requirement for the power class X includes at least one of EIS spherical coverage, or a reference sensitivity.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE.

For example, the stored a plurality of instructions may cause the UE to obtain downlink signal from a base station, wherein power class of the wireless device is power class X, which is for a vehicular wireless device configured to use an operating band including frequency range over 60 GHz, wherein the frequency range around 60 GHz is included in a frequency range of 52.6 GHz to 71 GHz, wherein at least one transceiver of the wireless device is configured to satisfy a RF requirement for the power class X, wherein the RF requirement for the power class X includes at least one of EIS spherical coverage, or a reference sensitivity.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A user equipment (UE) comprising:
at least one transceiver;
at least one processor; and
at least one computer memory operably connectable to the at least one processor and storing instructions that, based on being executed by the at least one processor, perform operations comprising:
receiving a downlink signal from a base station,
wherein the UE is a vehicular UE operating on a frequency range of 52.6 GHz to 71 GHz,
wherein receive radio frequency (RF) requirements related to the at least one transceiver includes at least one of effective isotropic sensitivity (EIS) spherical coverage, or a reference sensitivity,
wherein the UE is configured to use an operating band around 60 GHz included in the frequency range of 52.6 GHz to 71 GHz,
wherein a power class of the UE is power class X, which is for the vehicular UE operating on the operating band around 60 GHz, and
wherein the reference sensitivity is pre-configured based on a combination of channel bandwidth configured for receiving the downlink signal and total antenna gain of the at least one transceiver.

2. The UE of claim 1,
based on the total antenna gain of the at least one transceiver being 12.5 dBi:
wherein the reference sensitivity is equal to $-92\pm\Delta$ dBm for the channel bandwidth of 50 MHz;
wherein the reference sensitivity is equal to $-89\pm\Delta$ dBm for the channel bandwidth of 100 MHz;
wherein the reference sensitivity is equal to $-86\pm\Delta$ dBm for the channel bandwidth of 200 MHz;
wherein the reference sensitivity is equal to $-83\pm\Delta$ dBm for the channel bandwidth of 400 MHz; and
wherein $\Delta$ is a real number with a range of 0 dB to 2 dB.

3. The UE of claim 1,
based on the total antenna gain of the at least one transceiver being 15.5 dBi:
wherein the reference sensitivity is equal to $-95\pm\Delta$ dBm for the channel bandwidth of 50 MHz;
wherein the reference sensitivity is equal to $-92\pm\Delta$ dBm for the channel bandwidth of 100 MHz;
wherein the reference sensitivity is equal to $-89\pm\Delta$ dBm for the channel bandwidth of 200 MHz;
wherein the reference sensitivity is equal to $-86\pm\Delta$ dBm for the channel bandwidth of 400 MHz; and
wherein $\Delta$ is a real number with a range of 0 dB to 2 dB.

4. The UE of claim 1,
based on the total antenna gain of the at least one transceiver being 18.5 dBi:
wherein the reference sensitivity is equal to $-98\pm\Delta$ dBm for the channel bandwidth of 50 MHz;
wherein the reference sensitivity is equal to $-95\pm\Delta$ dBm for the channel bandwidth of 100 MHz;
wherein the reference sensitivity is equal to $-92\pm\Delta$ dBm for the channel bandwidth of 200 MHz;
wherein the reference sensitivity is equal to $-89\pm\Delta$ dBm for the channel bandwidth of 400 MHz; and
wherein $\Delta$ is a real number with a range of 0 dB to 2 dB.

5. The UE of claim 1,
based on the total antenna gain of the at least one transceiver being 12.5 dBi:
wherein the reference sensitivity is equal to $-80\pm\Delta$ dBm for the channel bandwidth of 800 MHz;
wherein the reference sensitivity is equal to $-79\pm\Delta$ dBm for the channel bandwidth of 1000 MHz;
wherein the reference sensitivity is equal to $-78.2\pm\Delta$ dBm for the channel bandwidth of 1200 MHz;
wherein the reference sensitivity is equal to $-77\pm\Delta$ dBm for the channel bandwidth of 1600 MHz;
wherein the reference sensitivity is equal to $-76\pm\Delta$ dBm for the channel bandwidth of 2000 MHz;
wherein the reference sensitivity is equal to $-75.7\pm\Delta$ dBm for the channel bandwidth of 2160 MHz; and
wherein $\Delta$ is a real number with a range of 0 dB to 2 dB.

6. The UE of claim 1,
based on the total antenna gain of the at least one transceiver being 15.5 dBi:
wherein the reference sensitivity is equal to $-83\pm\Delta$ dBm for the channel bandwidth of 800 MHz;
wherein the reference sensitivity is equal to $-82\pm\Delta$ dBm for the channel bandwidth of 1000 MHz;
wherein the reference sensitivity is equal to $-81.2\pm\Delta$ dBm for the channel bandwidth of 1200 MHz;
wherein the reference sensitivity is equal to $-80\pm\Delta$ dBm for the channel bandwidth of 1600 MHz;
wherein the reference sensitivity is equal to $-79\pm\Delta$ dBm for the channel bandwidth of 2000 MHz;
wherein the reference sensitivity is equal to $-78.7\pm\Delta$ dBm for the channel bandwidth of 2160 MHz; and
wherein $\Delta$ is a real number with a range of 0 dB to 2 dB.

7. The UE of claim 1,
based on the total antenna gain of the at least one transceiver being 18.5 dBi:
wherein the reference sensitivity is equal to $-86\pm\Delta$ dBm for the channel bandwidth of 800 MHz;
wherein the reference sensitivity is equal to $-85\pm\Delta$ dBm for the channel bandwidth of 1000 MHz;
wherein the reference sensitivity is equal to $-84.2\pm\Delta$ dBm for the channel bandwidth of 1200 MHz;
wherein the reference sensitivity is equal to $-83\pm\Delta$ dBm for the channel bandwidth of 1600 MHz;
wherein the reference sensitivity is equal to $-82\pm\Delta$ dBm for the channel bandwidth of 2000 MHz;
wherein the reference sensitivity is equal to $-81.7\pm\Delta$ dBm for the channel bandwidth of 2160 MHz; and
wherein $\Delta$ is a real number with a range of 0 dB to 2 dB.

8. The UE of claim 1,
wherein the EIS spherical coverage includes EIS value at $60^{th}$ percentile of complementary cumulative distribution function (CCDF),
wherein the EIS value at $60^{th}$ percentile of the CCDF is pre-configured based on a combination of channel bandwidth configured for receiving the downlink signal and total antenna gain of the at least one transceiver.

9. The UE of claim 8,
based on the total antenna gain of the at least one transceiver being 12.5 dBi:
wherein the EIS value at $60^{th}$ percentile of the CCDF is equal to $-81\pm\Delta$ dBm for the channel bandwidth of 50 MHz;

wherein the EIS value at $60^{th}$ percentile of the CCDF is equal to $-78\pm\Delta$ dBm for the channel bandwidth of 100 MHz;

wherein the EIS value at $60^{th}$ percentile of the CCDF is equal to $-75\pm\Delta$ dBm for the channel bandwidth of 200 MHz;

wherein the EIS value at $60^{th}$ percentile of the CCDF is equal to $-72\pm\Delta$ dBm for the channel bandwidth of 400 MHz; and wherein $\Delta$ is a real number with a range of 0 dB to 2 dB.

10. The UE of claim 8, based on the total antenna gain of the at least one transceiver being 15.5 dBi:

wherein the EIS value at $60^{th}$ percentile of the CCDF is equal to $-84\pm\Delta$ dBm for the channel bandwidth of 50 MHz;

wherein the EIS value at $60^{th}$ percentile of the CCDF is equal to $-81\pm\Delta$ dBm for the channel bandwidth of 100 MHz;

wherein the EIS value at $60^{th}$ percentile of the CCDF is equal to $-78\pm\Delta$ dBm for the channel bandwidth of 200 MHz;

wherein the EIS value at $60^{th}$ percentile of the CCDF is equal to $-75\pm\Delta$ dBm for the channel bandwidth of 400 MHz; and wherein $\Delta$ is a real number with a range of 0 dB to 2 dB.

11. The UE of claim 8, based on the total antenna gain of the at least one transceiver being 18.5 dBi:

wherein the EIS value at $60^{th}$ percentile of the CCDF is equal to $-87\pm\Delta$ dBm for the channel bandwidth of 50 MHz;

wherein the EIS value at $60^{th}$ percentile of the CCDF is equal to $-84\pm\Delta$ dBm for the channel bandwidth of 100 MHz;

wherein the EIS value at $60^{th}$ percentile of the CCDF is equal to $-81\pm\Delta$ dBm for the channel bandwidth of 200 MHz;

wherein the EIS value at $60^{th}$ percentile of the CCDF is equal to $-78\pm\Delta$ dBm for the channel bandwidth of 400 MHz; and wherein $\Delta$ is a real number with a range of 0 dB to 2 dB.

12. The UE of claim 8, based on the total antenna gain of the at least one transceiver being 12.5 dBi:

wherein the EIS value at $60^{th}$ percentile of the CCDF is equal to $-69\pm\Delta$ dBm for the channel bandwidth of 800 MHz;

wherein the EIS value at $60^{th}$ percentile of the CCDF is equal to $-68\pm\Delta$ dBm for the channel bandwidth of 1000 MHz;

wherein the EIS value at $60^{th}$ percentile of the CCDF is equal to $-67.2\pm\Delta$ dBm for the channel bandwidth of 1200 MHz;

wherein the EIS value at $60^{th}$ percentile of the CCDF is equal to $-66\pm\Delta$ dBm for the channel bandwidth of 1600 MHz;

wherein the EIS value at $60^{th}$ percentile of the CCDF is equal to $-65\pm\Delta$ dBm for the channel bandwidth of 2000 MHz;

wherein the EIS value at $60^{th}$ percentile of the CCDF is equal to $-64.7\pm\Delta$ dBm for the channel bandwidth of 2160 MHz; and wherein $\Delta$ is a real number with a range of 0 dB to 2 dB.

13. The UE of claim 8, based on the total antenna gain of the at least one transceiver being 15.5 dBi:

wherein the EIS value at $60^{th}$ percentile of the CCDF is equal to $-72\pm\Delta$ dBm for the channel bandwidth of 800 MHz;

wherein the EIS value at $60^{th}$ percentile of the CCDF is equal to $-71\pm\Delta$ dBm for the channel bandwidth of 1000 MHz;

wherein the EIS value at $60^{th}$ percentile of the CCDF is equal to $-70.2\pm\Delta$ dBm for the channel bandwidth of 1200 MHz;

wherein the EIS value at $60^{th}$ percentile of the CCDF is equal to $-69\pm\Delta$ dBm for the channel bandwidth of 1600 MHz;

wherein the EIS value at $60^{th}$ percentile of the CCDF is equal to $-68\pm\Delta$ dBm for the channel bandwidth of 2000 MHz;

wherein the EIS value at $60^{th}$ percentile of the CCDF is equal to $-67.7\pm\Delta$ dBm for the channel bandwidth of 2160 MHz; and wherein $\Delta$ is a real number with a range of 0 dB to 2 dB.

14. The UE of claim 8, based on the total antenna gain of the at least one transceiver being 18.5 dBi:

wherein the EIS value at $60^{th}$ percentile of the CCDF is equal to $-75\pm\Delta$ dBm for the channel bandwidth of 800 MHz;

wherein the EIS value at $60^{th}$ percentile of the CCDF is equal to $-74\pm\Delta$ dBm for the channel bandwidth of 1000 MHz;

wherein the EIS value at $60^{th}$ percentile of the CCDF is equal to $-73.2\pm\Delta$ dBm for the channel bandwidth of 1200 MHz;

wherein the EIS value at $60^{th}$ percentile of the CCDF is equal to $-72\pm\Delta$ dBm for the channel bandwidth of 1600 MHz;

wherein the EIS value at $60^{th}$ percentile of the CCDF is equal to $-71\pm\Delta$ dBm for the channel bandwidth of 2000 MHz;

wherein the EIS value at $60^{th}$ percentile of the CCDF is equal to $-70.7\pm\Delta$ dBm for the channel bandwidth of 2160 MHz; and wherein $\Delta$ is a real number with a range of 0 dB to 2 dB.

15. A method comprising:

receiving, by a user equipment (UE), a downlink signal from a base station, wherein the UE is a vehicular UE operating on a frequency range of 52.6 GHz to 71 GHz, wherein receive radio frequency (RF) requirements related to at least one transceiver of the UE includes at least one of effective isotropic sensitivity (EIS) spherical coverage, or a reference sensitivity, wherein the UE is configured to use an operating band around 60 GHz included in the frequency range of 52.6 GHz to 71 GHz, wherein a power class of the UE is power class X, which is for the vehicular UE operating on the operating band around 60 GHz, and wherein the reference sensitivity is pre-configured based on a combination of channel bandwidth configured for receiving the downlink signal and total antenna gain of the at least one transceiver.

16. A processing apparatus configured to control a wireless device, comprising:

at least one processor; and at least one computer memory operably connectable to the at least one processor, wherein the at least one processor is configured to perform operations comprising:

obtaining a downlink signal from a base station,
wherein the wireless device is a vehicular UE operating on a frequency range of 52.6 GHz to 71 GHz,
wherein receive radio frequency (RF) requirements related to at least one transceiver of the wireless device includes at least one of effective isotropic sensitivity (EIS) spherical coverage, or a reference sensitivity,
wherein the UE is configured to use an operating band around 60 GHz included in the frequency range of 52.6 GHz to 71 GHz,
wherein a power class of the UE is power class X, which is for the vehicular UE operating on the operating band around 60 GHz, and
wherein the reference sensitivity is pre-configured based on a combination of channel bandwidth configured for receiving the downlink signal and total antenna gain of the at least one transceiver.

* * * * *